United States Patent [19]

Dobler et al.

[11] Patent Number: 5,083,468
[45] Date of Patent: Jan. 28, 1992

[54] DEVICE FOR MEASURING ROTATION ANGLE AND/OR TORQUE

[75] Inventors: Klaus Dobler, Gerlingen; Hansjörg Hachtel, Weissach, both of Fed. Rep. of Germany

[73] Assignee: Robert Bosch GmbH, Stuttgart, Fed. Rep. of Germany

[21] Appl. No.: 490,665

[22] PCT Filed: Jul. 28, 1988

[86] PCT No.: PCT/DE88/00468
§ 371 Date: Mar. 2, 1990
§ 102(e) Date: Mar. 2, 1990

[87] PCT Pub. No.: WO89/02058
PCT Pub. Date: Mar. 9, 1989

[30] Foreign Application Priority Data

Sep. 2, 1987 [DE] Fed. Rep. of Germany ....... 3729230

[51] Int. Cl.⁵ ................................................ G01L 3/10
[52] U.S. Cl. .................................................. 73/862.33
[58] Field of Search ........... 73/862.33, 862.36, 862.69, 73/DIG. 2; 324/207.19, 209

[56] References Cited

U.S. PATENT DOCUMENTS

| 2,867,118 | 1/1959 | Cavanagh | 73/862.69 |
| 3,858,443 | 1/1975 | Roberts, III | 73/862.33 |
| 4,356,732 | 11/1982 | Hachtel | 73/862.33 |
| 4,448,084 | 5/1984 | Dobler et al. | 73/862.33 |

FOREIGN PATENT DOCUMENTS

| 3511490 | 10/1986 | Fed. Rep. of Germany . | |
| 0666448 | 6/1979 | U.S.S.R. | 73/862.36 |

Primary Examiner—Charles A. Ruehl
Attorney, Agent, or Firm—Michael J. Striker

[57] ABSTRACT

A measuring device for contact-free measuring of a rotation angle and/or torque of shaft comprises two coaxial bodies fastened on shaft stubs and rotatable relative to one another. The bodies have on their adjacent outer surfaces an equal number of areas having high and low electrical conductivity alternating in the circumferential direction. The bodies are enclosed by coils connected in a Wheatstone bridge circuit. A high-frequency alternating current flows through the coils and produces a magnetic alternating field which generates eddy currents in the outer surface areas of the two bodies in proportion to the magnitude of the surfaces of the two bodies penetrated by the magnetic alternating field.

11 Claims, 3 Drawing Sheets

DEVICE FOR MEASURING ROTATION ANGLE AND/OR TORQUE

BACKGROUND OF THE INVENTION

The invention relates to a measuring device for contact-free measuring of a rotation angle and/or torque of a shaft. In a known measuring device, the torque can be measured at the shaft by means of two cylindrical sleeves which are concentric to one another and to the shaft axis, rotatable relative to one another and divided at their circumferential surface into an equal number of a plurality of segment-like outer surface areas which are parallel to the shaft axis. The outer surface areas have high and low electrical conductivity alternating in the circumferential direction and are enclosed by at least one winding which is coaxial to the sleeves.

SUMMARY OF THE INVENTION

The object of the invention is a measuring device that has a high sensitivity, a relatively small temperature drift and a good measuring reliability. According to the invention, the sensitivity of the measuring device is improved by using four coils which are connected in a Wheatstone bridge circuit. An occurring temperature drift can accordingly be eliminated to a great extent. A relatively short overall length in spite of the incrased number of coils is achieved by arranging the coils side-by-side in abutting relationship with each other. In addition, the measuring reliability, and accordingly also the protection against failure of the device in which the measuring device is installed, is improved. An electronic arrangement for monitoring can determine immediately and unequivocally that a winding of the coils of the measuring device is short-circuited. At a so-called winding short circuit, one of the coils of the Wheatstone bridge is short circuited, so that the bridge circuit is detuned far beyond the limits of the measuring range, which is clearly detectable as an erroneous measurement signal.

The present invention both as to its construction so to its method of operation, together with additional objects and advantages thereof, will be best understood from the following detailed description of specific embodiments when read in connection with the accompanying drawings.

DESCRIPTION OF THE PREFERRED EMBODIMENTS

Figure 1:
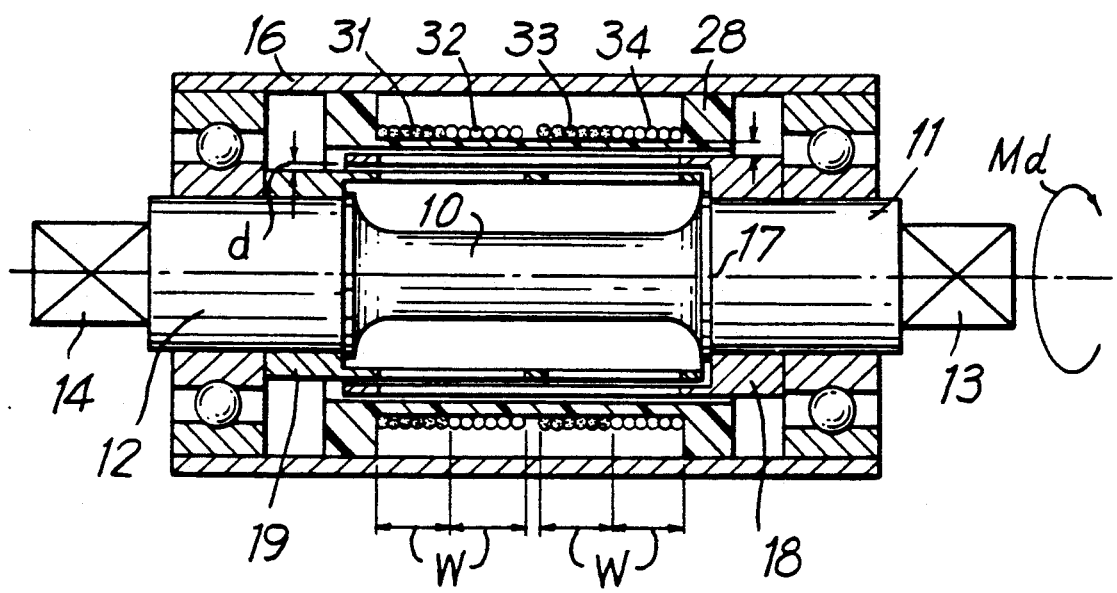
FIG. 1 shows a longitudinal cross-sectional view of a measuring device according to the invention.
Figure 2:
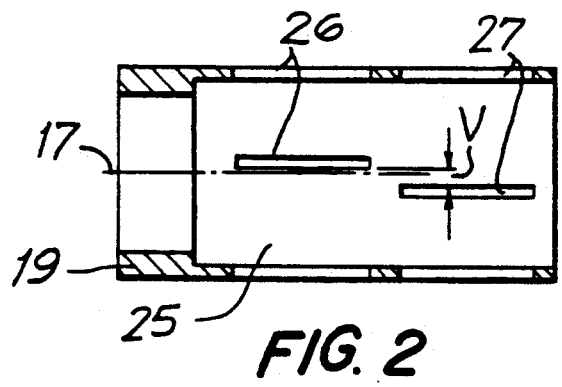
FIG. 2 shows a longitudinal cross-sectional view of the inner sleeve.
Figure 3:
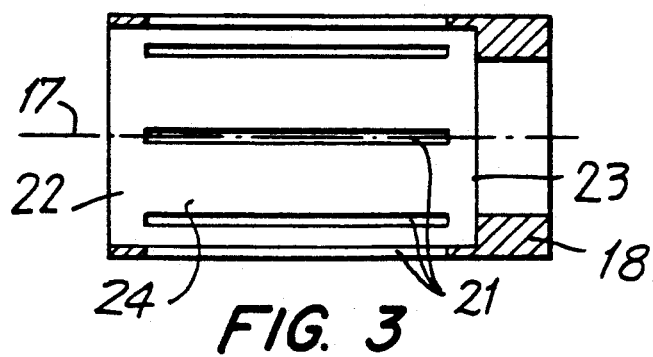
FIG. 3 shows a longitudinal cross-sectional view of the outer sleeve.

In FIG. 1, a torque rod 10 for detecting the rotation angle or torque is exposed to a torque between two shaft stubs 11 and 12. The shaft stub 11 on the right rotates relative to the shaft stub 12 on the left with a small angle of rotation. The shaft stubs 11, 12 are part of one shaft, e.g., a steering booster for motor vehicles. It is assumed in FIG. 1 that a torque Md acting in a clockwise direction is introduced into the shaft stub 11 via a square 13 and that a counter-torque, not shown, is acting at the square 14 connected with the shaft stub 12.

In order to determine the torque Md, the measuring arrangement, according to the invention, comprises two sleeves located in a tubular housing 16, namely an outer sleeve 18 and an inner sleeve 19 which are concentric to the mutual longitudinal axis 17 of the shaft and are made in each instance of electrically conducting, preferably non-magnetic material having a thickness of approximately 1 milliliter. The outer sleeve 18 is arranged on the shaft stub 11 on the right so as to be fixed against rotation relative to the stub 11, while the inner sleeve 19 is fastened in the same way on the shaft stub 12.

The outer sleeve 18 comprises a plurality of longitudinal slots 21, e.g., eight, which are uniformly distributed along its circumference, parallel to the longitudinal axis 17 and are milled in, sawed in or punched in and extend up to the vicinity of the two edge zones 22, 23 at the front. Outer surface areas 24 are accordingly formed between two longitudinal slots 21 respectively with an electrical conductivity corresponding to that of the sleeve material, while the longitudinal slots 21 alternating with these outer surface areas 24 in the circumferential direction form zones having no electrical conductivity.

In an analogous manner, the circumferential surface of the inner sleeve 19 is divided into interrelated zones 25 which overlap with the outer surface areas 24 of the outer sleeve 18 in a radial direction. Two rows of slots are formed in the inner sleeve 19 which comprise slots 26 and 27 extending parallel to the axis 17. The two slots 26 and 27 belonging to a slot pair, are offset relative to one another in the circumferential direction of the sleeve 19 by a distance v which corresponds approximately to the slot width and e.g. amounts to approximately one millimeter. Each of the two slots 26 and 27 has an axial length which is only approximately half as great as the assigned slot 21 in the outer sleeve 18.

A cylindrical coil body 28 which is produced from an insulating material and comprises two coils 31, 32 in the area of the slot 26 and also two coils 33, 34 in the area of the slot 27 is provided in the overlapping area of the inner an outer sleeves. The coils 31 to 34 are wound on the coil body 28 in one layer. The coils 31, 32 and 33, 34, respectively, abut one another in order to obtain the shortest possible overall length. In addition, a magnetic coupling is accordingly achieved between the coils 31, 32 and 33, 34, respectively. The maximum width w of the windings of the coils 31, 32 and 33, 34, respectively, measured in the axial direction should not exceed the length of the slots 26 and 27, respectively. It has proven particularly advantageous that the coils 31, 32 and 33, 34, respectively, overlap the slots 26, 27 in a winding area and the edge areas of the slots are not contacted, particularly due to the interference signals possibly occurring in the latter.

Figure 4:
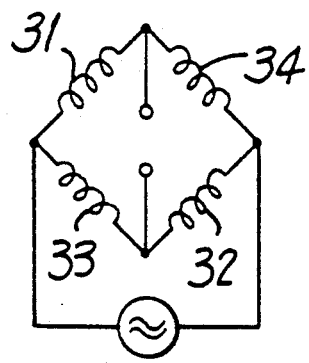
FIG. 4 shows a circuitry of arrangement of coils of the measuring device according to the invention.

A difference measurement method by using a Wheatstone bridge circuit, shown in FIG. 4, is possible when using the four coils 31 to 34. The coils 32, 31 and 33, 34, respectively, which overlap a slot 26 and 27 of the inner sleeve 19 respectively, are connected in the respective opposite arms of the Wheatstone bridges. The two sleeves 18 and 19 are rotated radially relative to one another in an almost linear dependency on the magnitude of the applied torque Md in such a way that one of the two offset slots 26 and 27 moves out of the overlapping with the slot 21 of the outer sleeve 18, while the other shortened slot moves under the respective outer slot as the overlapping increases. In so doing, a decrease in inductance is achieved in coil 31, 32 and an increase in inductance is achieved in the other coils 33, 34, or vice versa, thus, the eddy currents produced in the inner sleeve 19 increase or decrease when high-frequency alternating current flows through the windings.

It is particularly important for a high sensitivity of the measuring device that the radial distance c between the coils 31 to 34 and the outer circumference of the outer sleeve 18 and the radial distance d between the inner (19) and the outer sleeve 18 are kept as small as possible. A compensation of temperature drift and measurement error is possible to a great extent when using at least four coils 31 to 34.

Figure 5:
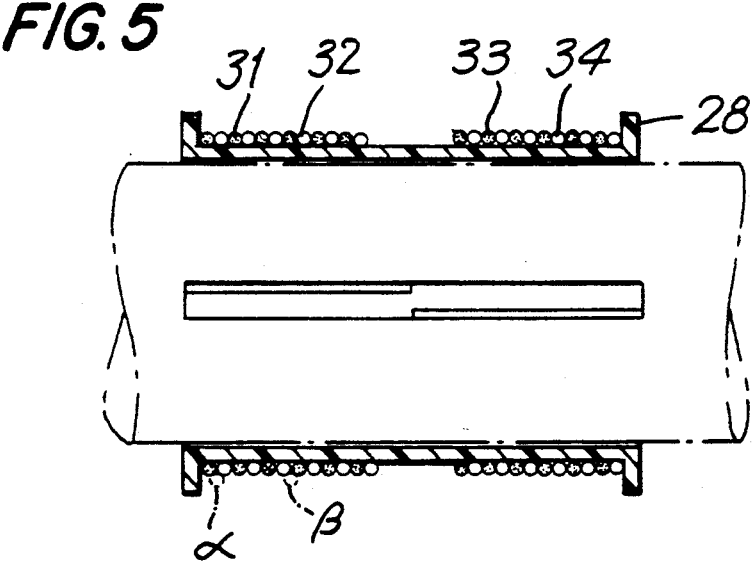
FIGS. 5 and 6 show a partial view of a modified embodiments of the measuring device according to the invention.

In the embodiment according to FIG. 5, an increase in the measuring reliability is achieved in a particularly advantageous manner particularly when the measuring unit in the motor vehicle is used as a so-called steering booster. The coils 31, 32 and 33, 34, respectively, assigned to one slot are wound in a parallel manner adjacent to one another in such a way that a winding of the coil 31 is always adjacent to a winding of the coil 32 and they contact one another. The same applies for the coils 33, 34. The two coils 31, 32 and 33, 34, respectively, are accordingly wound in one another in such a way that the magnetic alternating fields of the windings of the coils 31, 32 and 33, 34, respectively, add up. The magnetic coupling between the coils 31, 32 and 33, 34, respectively achieved in this manner, results in the reciprocal strengthening of the measuring effect due to the winding of the coils in one another and, therefore, permits to reduce the overall length of the measuring device. A long overall length can be dispensed with strengthening the measuring effect. In the event of a winding short circuit, e.g. in the area, i.e. between the windings of the coils 31, 32 and 33, 34, one of the coils of the Wheatstone bridge is practically short circuited, so that the voltage signal tapped at the bridge is clearly detuned and is clearly distinguished from the actual measurement voltage. A subsequently arranged electronic monitoring arrangement immediately detects the erroneous voltage signal. The exact location of the winding short circuit between the two coils is of no importance, since correspondingly large areas of the coils are bridged.

If the winning short circuit is located e.g., in the area approximately in the enter of the slot 26, approximately half of the coil 31 or half of the coil 32 is short circuited. Because of the Wheatstone bridge circuit, there is again a clear erroneous voltage signal.

Figure 6:
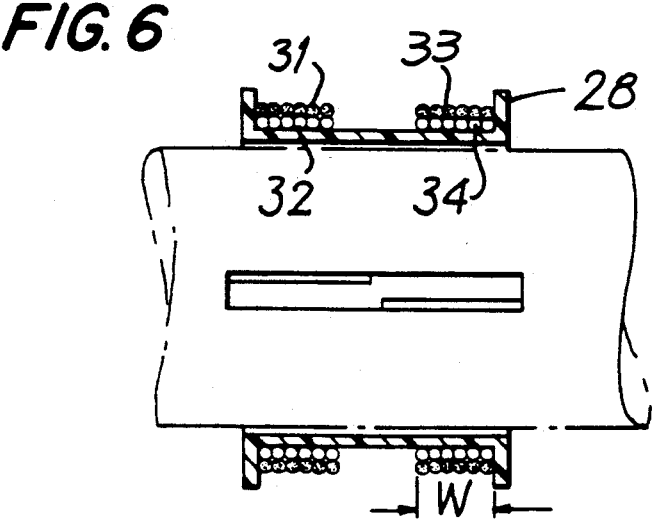

The one-layer coils 31, 32 and 33, 34, respectively, are arranged one above the other in FIG. 6. A particularly short axial overall length is thereby possible. However, monitoring reliability is possible only conditionally.

The arrangement of the coils of the measuring device is not limited only to a construction with sleeves 18, 19. It can also be used in an embodiment of the measuring device with two disks, wherein the disks correspond to the sleeves with regard to their action.

Figure 7:
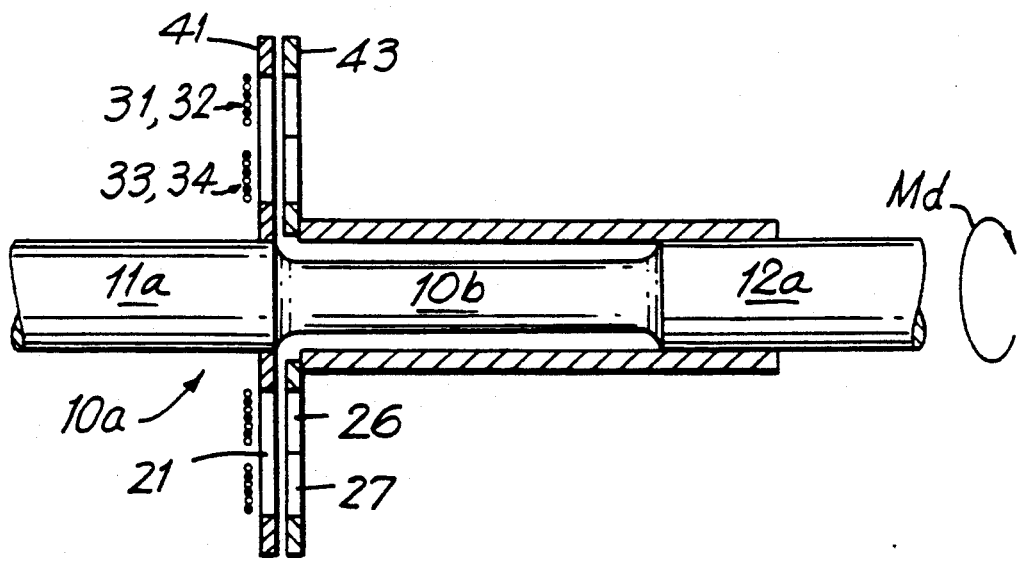
FIG. 7 shows a partial cross-sectional view of yet another embodiment of the measuring device according to the invention.
Figure 8:
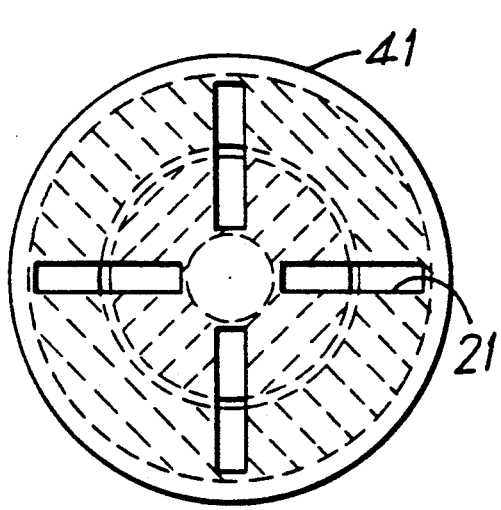
FIGS. 8 and 9 show side views of disc-like bodies.
Figure 9:
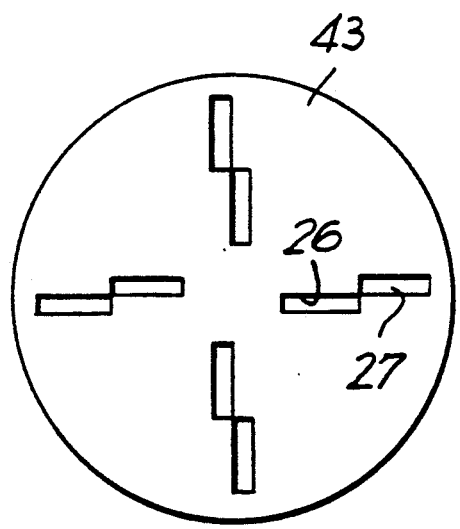

For this purpose, according to FIG. 7, a first disk 41 is arranged on the shaft 10a so as to be fixed against rotation relative to the shaft 10a, and comprises a plurality of radially extending slots 21, as can be seen in the embodiment shown in FIG. 7, and as are shown in more detail in FIG. 8. In addition, a second disk 43 is arranged at a slight distance from the disk 41 and likewise comprises a plurality of radially extending slots 26, 27 which are offset relative to one another. The disk 43 corresponds in effect to the inner sleeve 19 and is shown in more detail in the drawing. The shaft 10a again comprises a torsion portion 10(b) whose rotation is proportional to the transmitted torque Md. The disk 41 is fastened on the end portion 11a, e.g., by means of a weld joint, and the far disk 43 is fastened on the other end portion 12a of the shaft 10a by means of a pipe 45. Two coils 31, 32 and 33, 34, respectively, which can be stationary in spaces, are located opposite the free front side of the first disk 41 in the area of the slot 26, 27. The coils 31, 32, 33, 34 can be wound according to FIGS. 1, 5 or 6 corresponding to the above embodiment. The particularly advantageous arrangement of the coils which are wound in a parallel manner adjacent to one another, as shown in FIG. 5, is shown in FIG. 7. This arrangement is characterized by an offset drift compensation resulting to a great extent from appropriate bearing clearance. In addition, it is also possible to arrange additional coils in the area of the slots 26, 27 on the front side of the disk 43. The coils of the two front sides are arranged in a mirror-inverted manner relative to one another, and respective oppositely located coils are connected in an arm of a Wheatstone bridge. In addition to the offset drift, the change in sensitivity effected by the axial displacement of the two disks 41, 43 relative to the coils can be reduced.

While the invention has been illustrated and described as embodied in a device for contact free measuring of a torqued and/or rotational angle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for contact-free measuring of at least one of rotation angle and a torque of a shaft, said device comprising two bodies mounted on the shaft coaxially therewith, rotatable relative to each other, and having on their adjacent outer surfaces an equal number of areas having alternating high and low electrical conductivity; and a plurality of windings associated with said two bodies and defining measurement regions, each measurement region being formed by at least two windings with windings of each measurement region abutting each other so that an inductive coupling of the windings of each measurement region defines the measurement region, the windings of the measurement region having their loops alternatively wound adjacent to each other and parallel to each other in such a manner that a loop of one winding abuts a loop of another winding whereby upon connection of the windings in a full bridge circuit, a reliable monitoring of functioning of said measuring device is possible.

2. A device as set forth in claim 1, wherein a high frequency alternating current flows through the windings when they are connected in said full bridge circuit.

3. A device as set forth in claim 1, wherein the windings are formed as one-layer windings.

4. A device as set forth in claim 1, wherein one of said two bodies has a longitudinal extent and a plurality of first and second slots formed in two longitudinal halves of the longitudinal extent of said one of said two bodies with longitudinally opposite slots being offset relative to each other, another of said two bodies having a plurality of slots extending along almost a total length of said another of said two bodies.

5. A device as set forth in claim 4, wherein said windings are arranged centrally over one of said first and second slots.

6. A device as set forth in claim 4, wherein each of said first and second slots have a length equal to substantially a half of a length of said slots of said another of said two bodies.

7. A device as set forth in claim 4, wherein said one of said two bodies is an inner body and the other of said two bodies is an outer body concentric with said inner body.

8. A device as set forth in claim 7, wherein said two bodies are cylindrical sleeves.

9. A device as set forth in claim 1, wherein said two bodies are disc-shaped bodies.

10. A device as set forth in claim 9, wherein one of said disc-shaped body has a radial extent and a plurality of slots formed in two radial halves of the radial extent of said one of said two disc-shaped bodies, with radially opposite slots being circumferentially offset relative to each other, another of said two bodies having a plurality of slots extending along almost a total radial extent of said another of said two disc-shaped bodies.

11. A device as set forth in claim 10, wherein said coils are arranged on front sides of said two disc-shaped bodies opposite one another in a mirror-inverted manner in areas of respective slots.

* * * * *